United States Patent [19]

Goto et al.

[11] 4,076,000

[45] Feb. 28, 1978

[54] INTERNAL COMBUSTION ENGINE HAVING AN AUXILIARY COMBUSTION CHAMBER WITHOUT AN INTAKE VALVE

[75] Inventors: Kenji Goto; Takao Tate, both of Susono, Japan

[73] Assignee: Toyota Jidosha Kogyo Kabushiki Kaisha, Toyota, Japan

[21] Appl. No.: 677,288

[22] Filed: Apr. 15, 1976

[51] Int. Cl. ............................................. F02b 23/00
[52] U.S. Cl. ............................ 123/191 S; 123/30 D; 123/32 SP
[58] Field of Search ............ 123/30 C, 32 ST, 32 SP, 123/32 SA, 32 MS, 75 B, 191 S, 191 SP, 148 C, DIG. 4, 30 D

[56] References Cited

U.S. PATENT DOCUMENTS

| 1,782,395 | 11/1930 | Bullington | 123/191 SP |
| 1,812,197 | 6/1931 | Bullington | 123/191 SP |
| 1,833,445 | 11/1931 | Summers | 123/191 SP |
| 1,847,612 | 3/1932 | Horning | 123/191 S |
| 2,314,175 | 3/1943 | Summers | 123/191 SP |
| 2,422,610 | 6/1947 | Bagnulo | 123/32 ST |
| 2,924,210 | 2/1960 | Summers | 123/32 SP |
| 3,304,922 | 2/1967 | Hideg | 123/75 B |
| 3,313,278 | 4/1967 | Thuesen | 123/75 B |
| 3,318,292 | 5/1967 | Hideg | 123/75 B |
| 3,807,369 | 4/1974 | Yagi et al. | 123/32 SP |
| 3,982,504 | 9/1976 | Noguchi et al. | 123/32 SP |
| 4,029,075 | 6/1977 | Noguchi et al. | 123/32 SP |
| 4,034,720 | 7/1977 | Noguchi et al. | 123/32 SP |

Primary Examiner—Martin P. Schwadron
Assistant Examiner—G. L. Walton
Attorney, Agent, or Firm—Stevens, Davis, Miller & Mosher

[57] ABSTRACT

An internal combustion engine having a main combustion chamber associated with intake and exhaust valves and an auxiliary combustion chamber having no intake valve. The auxiliary combustion chamber is positioned adjacent the intake port and has an electrode of a spark plug or plugs positioned therewithin. A plurality of passages fluidly communicate the main and auxiliary combustion chambers. One passage opens toward the intake valve and at least one other passage opens asymmetrically relative to the first passage about the central axis of the auxiliary combustion chamber. The auxiliary combustion chamber is free of any internal fluid flow obstructions. A stream of sucked gas introduced into the auxiliary combustion chamber through the one passage is turned by the interior walls of the auxiliary combustion chamber to flow in a path in the form of a loop and is then expelled through the other passage.

15 Claims, 6 Drawing Figures

INTERNAL COMBUSTION ENGINE HAVING AN AUXILIARY COMBUSTION CHAMBER WITHOUT AN INTAKE VALVE

BACKGROUND OF THE INVENTION

1. Field of the Invention

This invention relates to an internal combustion engine provided with an auxiliary combustion chamber having no intake valve and designed to effect scavenging with a stream of sucked gas.

2. Description of the Prior Art

Various methods have been proposed to eliminate toxic substances contained in the exhaust gases from internal combustion engines. One of those methods consists of burning a lean fuel-air mixture. This is a very effective method, taking advantage of the fact that burning a fuel-air mixture with a large proportion of air reduces toxic substances, especially NOx, in the exhaust gases.

Usually, lean fuel-air mixtures are not readily ignited and slowly propagate the flame, which decreases the thermal efficiency of the cycle and gives rise to the problem of after-burning. This phenomenon occurs when the caloric force of an ignition source, which sets fire to the lean fuel-air mixture, is weak. Accordingly, this problem can be solved by increasing the ignition caloric force. To realize this solution, it was proposed to provide an auxiliary combustion chamber in addition to a main combustion chamber so that a lean fuel-air mixture in the latter chamber will be ignited by the flame from the former chamber. In a typical example of this type, a relatively rich fuel-air mixture is supplied to the auxiliary combustion chamber through an intake valve fitted thereto. This relatively rich fuel-air mixture in the auxiliary combustion chamber is ignited and burnt by an ignition spark plug. The flame thus produced flows into the main combustion chamber to burn a lean fuel-air mixture therein. This method is very effective because ignition in the auxiliary combustion chamber can be readily accomplished. However, the structure of the auxiliary combustion chamber became complex, because of the necessity of providing the intake valve therefor.

There is another method that provides an auxiliary combustion chamber having no intake valve adjacent to the main combustion chamber. According to this method, a lean fuel-air mixture in the main combustion chamber is forced into the aforesaid auxiliary combustion chamber on the compression stroke and ignited by the ignition spark plug. The flame produced is sent into the main combustion chamber to burn the lean fuel-air mixture therein. This method has a shortcoming that the exhaust gases resulting from the combustion on the preceding stroke remain in the auxiliary combustion chamber, which makes it difficult to ignite the mixture on the next stroke.

To do away with this shortcoming, the inventors have previously proposed an internal combustion engine that comprises a main and auxiliary combustion chamber communicated by a plurality of passages, wherein part of the passages is directed toward a stream of sucked air in order to scavenge the auxiliary combustion chamber.

SUMMARY OF THE INVENTION

An object of this invention is to insure the scavenging of the auxiliary combustion chamber of the internal combustion engine of the above-described type by the use of the stream of sucked gas and to increase the durability of the auxiliary combustion chamber.

Another object of this invention is to provide an internal combustion engine with an auxiliary combustion chamber having no intake valve that is easy to construct by increasing the degree of freedom with which the ignition spark plug can be fitted.

The feature of this invention lies in the fact that, in an internal combustion engine that comprises a main combustion chamber, an auxiliary combustion chamber having no intake valve and positioned near the intake port in the main combustion chamber and provided with an ignition spark plug on its inside, and a plurality of passages intercommunicating the main and auxiliary combustion chambers, the passages comprise a first passage means, which comprises at least one passage, opening toward a stream of sucked gas deflected by the disc portion of an intake valve in the main combustion chamber, with the direction of flow therein intersecting at an acute angle with the interior wall of the auxiliary combustion chamber lying symmetrical with respect to the central axis thereof, and a second passage means, comprising at least one passage, opening asymmetrically to said first passage with respect to the central axis of the auxiliary combustion chamber, and the stream of sucked gas introduced through the first passage means is turned successively by the inside walls on the opposite side, at the top, and on the first passage means side of the auxiliary combustion chamber and then expelled through the second passage means flowing like the loop scavenged gas in a two-stroke cycle engine.

This invention with the above-described construction permits efficient scavenging of the auxiliary combustion chamber, increases the ease with which the fuel-air mixture is ignited, and also increases the proportion of air in the mixture. Furthermore this invention simplifies the structure of the auxiliary combustion chamber and improves its durability.

BRIEF DESCRIPTION OF THE DRAWINGS

This invention will now be described in detail, with reference to the accompanying drawings, in which.

DETAILED DESCRIPTION OF THE PREFERRED EMBODIMENTS

Figure 1:
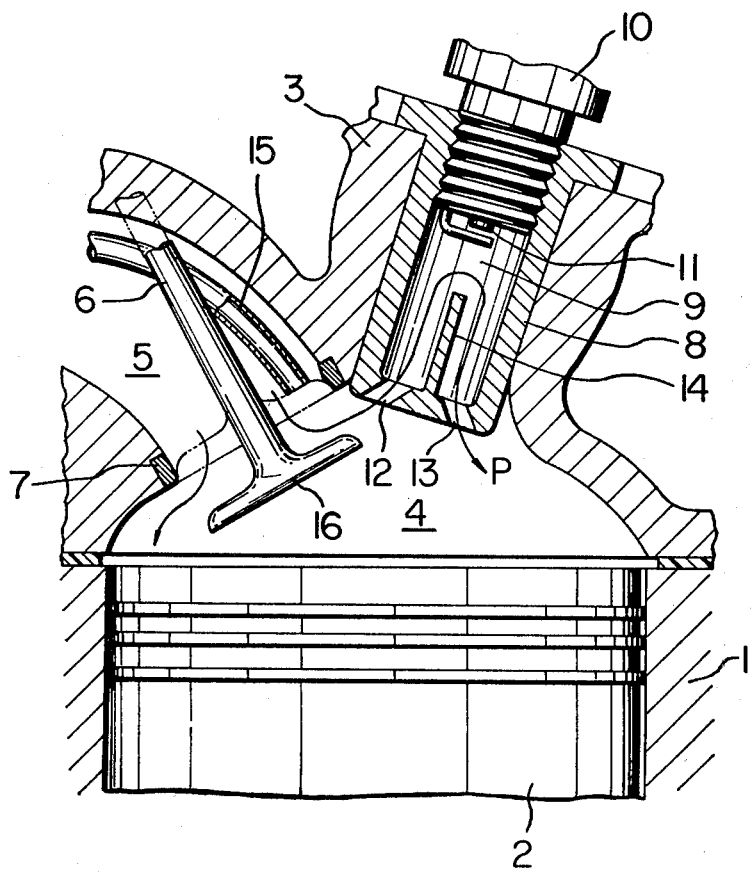
FIG. 1 is a schematic cross-sectional view of a conventional internal combustion engine, in which an auxiliary combustion chamber having no intake valve is scavenged with a stream of sucked gas.

With reference to FIG. 1, the scavenging of an auxiliary combustion chamber having no intake valve in an internal combustion engine of the known type will be described first.

Through an intake passage 5 and an intake valve 6, a lean fuel-air mixture is drawn into a main combustion chamber 4 that consists of a clearance space defined by a piston 2 fitted in a cylinder 1 and a cylinder head 3. Near an intake port 7 in the cylinder head 3 is fitted an auxiliary combustion chamber element 8 to form an auxiliary combustion chamber 9. An electrode 11 of an ignition spark plug 10 is within the auxiliary combustion chamber 9, and the auxiliary combustion chamber element 8 is formed with two passages 12 and 13 communicating the auxiliary and main combustion chambers 9 and 4. Of these two passages, the passage 12 opens toward the intake port 7 side of the auxiliary combustion chamber element 8, while the other passage 13 opens on the opposite side. Inside the auxiliary combustion chamber element 8 is provided a diaphragm 14 which approximately bisects the auxiliary combustion chamber 9. A rich fuel-air mixture supply pipe 15 is fitted inside the intake passage 5, so that one end thereof opens against that edge of the disc portion 16 of the intake valve 6 which is closer to the auxiliary combustion chamber element 8. When the intake valve 6 closes, the one end of the pipe 15 is closed by the disc portion 16 (as illustrated by a dot-dash line).

A description of the operation of the scavenging of the above-described auxiliary combustion chamber having no intake valve in the internal combustion engine of the known type will now be given.

As the internal combustion engine enters the induction stroke, the piston 2 fitted in the cylinder 1 moves downward to open the intake valve 6 and thereby draws a lean fuel-air mixture from the intake passage 5. This stream of sucked gas flows into the main combustion chamber 4 as shown by the arrow. Part of the stream P, however, is deflected by the disc portion 16 of the intake valve 6 and is drawn into the auxiliary combustion chamber 9 through the passage 12 formed in the auxiliary combustion chamber element 8. This stream P flows along the diaphragm 14 in the auxiliary combustion chamber 9 and into the main combustion chamber 4 through the other passage 13. By means of the stream of sucked gas P, the auxiliary combustion chamber 9 can be scavenged perfectly free of residual combustion gas produced on the preceding stroke. This removes the residual exhaust gas from the region at and adjacent to the electrode 11 of the ignition spark plug 10 to thereby improve its igniting function. In addition the rich fuel-air mixture from the supply pipe 15 mixes with the stream of sucked air P only. This decreases the proportion of air in the stream P and thus makes it easier to ignite in the auxiliary combustion chamber 9. On the other hand, the proportion of air in the lean fuel-air mixture drawn through the intake passage 5 can be increased, which, in turn, decreases such toxic substances in the exhaust gases as HC, CO and NOx.

With all the above-described advantages, the conventional combustion engine having the auxiliary combustion chamber without an intake valve has the following shortcomings. The auxiliary combustion chamber 9 is not thoroughly scavenged because the stream of sucked air P, turning several times in the auxiliary combustion chamber 9, suffers from a great pressure loss. If the cross-sectional areas of the passages 12 and 13 are increased to improve the efficiency of scavenging, the lean fuel-air mixture in the main combustion chamber 4 would be burnt, which in turn would decrease the flame ejected through the passages 12 and 13. Further, the diaphragm 14 is disposed in that area of the auxiliary combustion chamber 9 where the temperature becomes highest. Therefore, the diaphragm 14, molded in one piece with the auxiliary combustion chamber element 8, must be made of some highly heat-resistant, costly material. In addition, the presence of the diaphragm 14 limits the position of not only the ignition spark plug 10, but also its electrode 11, inserted in the auxiliary combustion chamber 9. This decreases the degree of freedom of construction of the engine. Also, the diaphragm 14, being superheated, causes advanced ignition in the auxiliary combustion chamber 9.

This invention improves the above-described shortcomings of the conventional internal combustion engine having the auxiliary combustion chamber without an intake valve. Embodiments of this invention will now be described with reference to FIGS. 2, 3, 4, 5 and 6.

Figure 2:
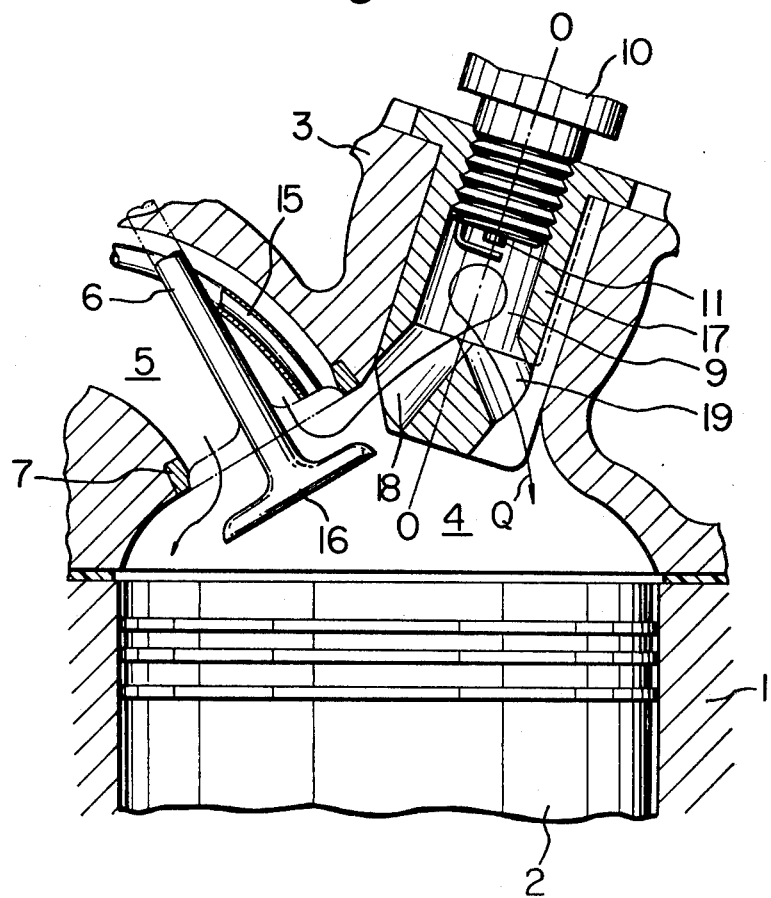
FIG. 2 is a schematic cross-sectional view of an internal combustion engine according to this invention which has an auxiliary combustion chamber without an intake valve.

The engine shown in FIG. 2 is similar to that shown in FIG. 1 except for the structure of the auxiliary combustion element 8. In order to simplify the description, similar parts are denoted by similar reference numerals and their detailed description is omitted.

Figure 3:
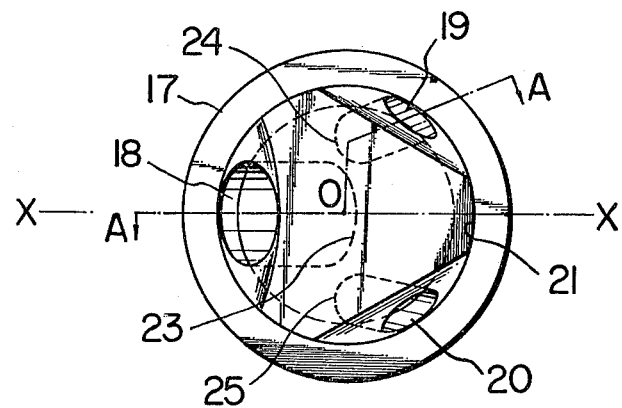
FIG. 3 is a front view of an auxiliary combustion chamber element separated from the cylinder.
Figure 4:
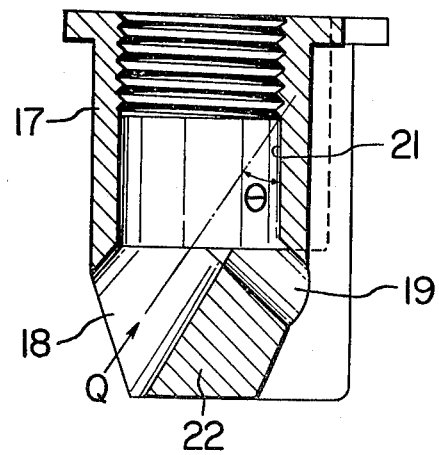
FIG. 4 is a cross-sectional view taken along the line A—A of FIG. 3.

In FIGS. 2 through 4, an auxiliary combustion chamber element 17 of this invention has a first passage 18 opening toward a stream of sucked air (shown as Q) deflected by the disc portion 16 of the intake valve 6 and second passages 19 and 20, preferably two in number, opening approximately symmetrical to the first passage 18 with respect to the central axis O of the auxiliary combustion chamber 9. The passage 18 and each of the passages 19, 20, are however disposed asymmetrically with respect to the central axis O (see FIG. 4). The passage 18 and the passages 19 and 20 are not limited in number. However, their cross-sectional areas are limited in order to make the flame of the combustion gas in the auxiliary combustion chamber 9 suitable for the combustion of a lean fuel-air mixture in the main combustion chamber 4. The auxiliary combustion chamber element 17 according to this invention does not include the diaphragm 14 formed in the conventional auxiliary combustion chamber element 8 and therefore does not present any obstacle or obstruction against the flow in the auxiliary combustion chamber 9. Also, the auxiliary combustion chamber 9 has a cylindrical shape. The passage 18 is provided at such an angle relative to the central axis O as described hereunder. The stream of sucked air Q flowing through the passage 18 intersects at an acute angle $\theta$ (FIG. 4) with the internal wall 21 of the auxiliary combustion chamber lying symmetrical to the first passage 18 with respect to the central axis O of the auxiliary combustion chamber. Also, the passage 18 must be long enough to make the stream of sucked air Q to flow in a desired direction, preferably of a length equal to $\frac{1}{2}$ or more of its inside diameter. In this embodiment, to obtain the necessary length, the passage 18 is provided in a thicker portion 22 formed on the auxiliary combustion chamber element 17. Further, in order to raise the scavenging efficiency in the auxiliary combustion chamber 9, an opening 23 of the passage 18 in the auxiliary combustion chamber is positioned near the central axis O of the auxiliary combustion chamber, and openings 24 and 25 of the passages 19 and 20, respectively, are positioned symmetrical with respect to the longitudinal, central plane X—X along the stream Q flowing through the passage 18, with the opening 23 therebetween (see FIG. 3). The stream of sucked air Q, drawn in through the passage 18, turns inside the auxiliary combustion chamber 9, impinging successively on that side of the auxiliary combustion chamber element 17 where the passages 19 and 20 open, the top of the auxiliary combustion chamber 9, and that side of the auxiliary combustion chamber element 17 where the passage 18 opens. The stream thus deflected flows out through the passages 19 and 20, travelling along a flow path similar to a curve that is followed in effecting the loop scavenging of the two-stroke cycle engine (as illustrated by Q in FIG. 2). The passages 19 and 20 also form such an angle relative to the central axis O to discharge the deflected stream Q smoothly.

The operation of this embodiment as described above will now be described.

As the internal combustion engine enters the induction stroke, the piston 2 fitted in the cylinder 1 descends to open the intake valve 6 and thereby draws in a lean fuel-air mixture from the intake passage 5. This stream of sucked gas flows into the main combustion chamber 4 as illustrated by the arrow. Part of this sucked stream Q is deflected by the disc portion 16 of the intake valve 6 and is drawn into the auxiliary combustion chamber 9 through the passage 18 formed in the auxiliary combustion chamber element 17. This stream Q thus introduced makes a turn in the form of a loop and goes out through the passages 19 and 20. In this construction also, the rich fuel-air mixture from its supply pipe 15 mixes with said sucked stream Q only and thereby decreases the proportion of air in the auxiliary combustion chamber 9, which makes the mixture easier to ignite therein. Furthermore, this construction permits increasing the proportion of air in the lean fuel-air mixture drawn through the intake passage 5.

In the above-described embodiment, the auxiliary combustion chamber 9 is provided by fitting the auxiliary combustion chamber element 17 in the cylinder head 3. The auxiliary combustion chamber 9, however, may be integrally formed in the cylinder head 3. Also, the rich fuel-air mixture supply pipe 15 does not need to be provided in the intake passage 5. Instead, a lean fuel-air mixture may be drawn into the auxiliary combustion chamber 9 having no intake valve in order to accomplish its scavenging.

Figure 5:
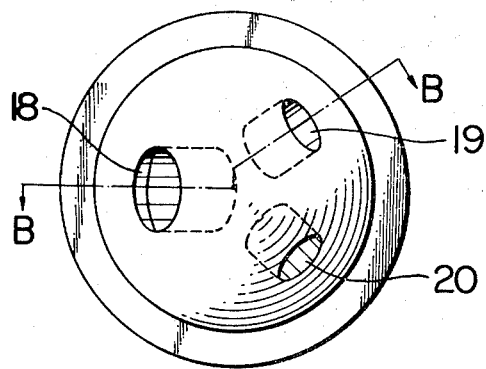
FIG. 5 is a front view showing an auxiliary combustion chamber element in another embodiment of this invention.
Figure 6:
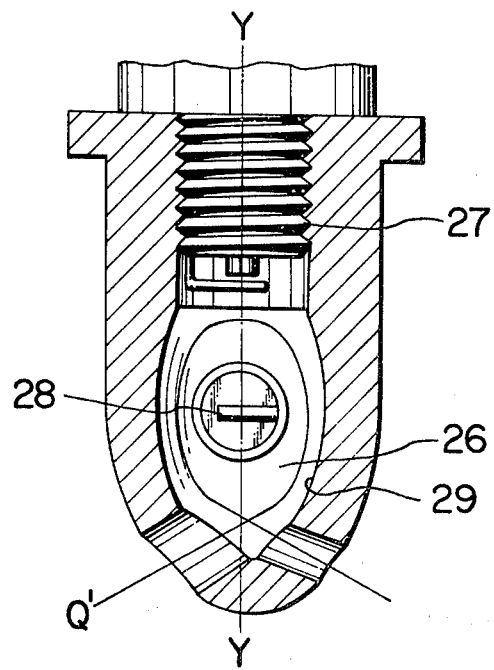
FIG. 6 is a cross-sectional view taken along the line B—B of FIG. 5.

Another embodiment of the invention is shown in FIGS. 5 and 6. In this embodiment, an auxiliary combustion chamber 26, elliptical in longitudinal cross-section and circular in transverse cross-section, is provided with two ignition spark plugs 27 and 28 on its inside. The spark plug 27 is disposed at a position most remote from the passages 18, 19 and 20, whereas the spark plug 28 is provided in an internal wall 29 approximately at the center of the ellipse. According to this embodiment, the stream of sucked air Q flows smoothly, following a loop path, along the elliptical internal wall 29 of the auxiliary combustion chamber, thus improving the scavenging efficiency greatly. Also, the provision of the two ignition spark plugs makes it easier to ignite the mixture.

This invention, which is constructed and functions as described above, has several advantages which are given below. Because the stream of sucked gas drawn into the auxiliary combustion chamber makes a looping turn before being discharged therefrom, the stream flows in one direction, resulting in less pressure loss. As a consequence, the combustion gas of the preceding stroke remaining in the region at and adjacent to the electrode of the ignition spark plug can be effectively scavenged which improves the ignitability in the auxiliary combustion chamber and thereby increases the operating efficiency and reliability of internal combustion engines using lean fuel-air mixtures. The absence of unessential structure (such as the diaphragm in the known example described previously) in the auxiliary combustion chamber eliminates the possibility of overheating which thereby improves the durability of the auxiliary combustion chamber and prevents the occurrence of advanced ignition due to its partial overheating. This absence of unessential structure also increases the degree of freedom of construction with regard to the installation of the ignition spark plug or plugs. More specifically, the position of the electrode of the ignition spark plug or plugs may be selected with more relative freedom. The position of the electrodes exerts a great influence on ignitability. Therefore, it is an important advantage in constructing an engine that the position of the electrodes may be selected more freely.

What is claimed is:

1. An internal combustion engine having an auxiliary combustion chamber without an intake valve comprising:
    a cylinder;
    a cylinder head;
    a piston in said cylinder;
    means defining an intake port in said cylinder head;
    said piston, said cylinder, and said cylinder head defining a main combustion chamber;
    said intake port opening into said main combustion chamber;
    an intake valve, having a disc portion, operatively associated with said intake port;
    means, having an interior wall, defining an auxiliary combustion chamber, having no intake valve, positioned adjacent said intake port;
    an ignition plug having an electrode within said auxiliary combustion chamber; and
    means defining a plurality of passage means fluidly intercommunicating said main combustion chamber and said auxiliary combustion chamber, a first one of said passage means opening toward a stream of sucked gas deflected by the disc portion of said intake valve in said main combustion chamber, with the direction of flow therein intersecting at an acute angle with the interior wall of the means defining the auxiliary combustion chamber lying symmetrical with respect to a central longitudinal axis thereof, a second one of said passage means opening at a position remote from the intake valve, the central axis of the second passage means being not in a plane containing the central axis of the first passage means whereby the interior of the auxiliary combustion chamber is loop-scavenged.

2. An internal combustion engine as claimed in claim 1, wherein:
    said means defining the auxiliary combustion chamber comprises an auxiliary combustion chamber element separate from said cylinder head.

3. An internal combustion engine as claimed in claim 2, wherein:
    the lower end of the auxiliary combustion chamber element has a portion thicker than the remainder thereof, and the first passage means is defined in said thicker portion.

4. An internal combustion engine as claimed in claim 1, wherein:
    said auxiliary combustion chamber element is fitted in said cylinder head.

5. An internal combustion engine as claimed in claim 1, wherein:
said first passage means comprises a single passage; and
said second passage means comprises two passages disposed symmetrically relative to said single passage.

6. An internal combustion engine as claimed in claim 5, wherein:
the single passage opens into the auxiliary combustion chamber adjacent the central longitudinal axis thereof; and
said two passages open into the auxiliary combustion chamber with the opening of said single passage positioned therebetween.

7. An internal combustion engine as claimed in claim 5, wherein:
said single passage is circular in cross-section and has a length of at least one half the diameter thereof to turn a stream of sucked gas flowing therethrough in a desired direction.

8. An internal combustion engine as claimed in claim 1, wherein:
said auxiliary combustion chamber is cylindrical.

9. An internal combustion engine as claimed in claim 1, wherein:
said auxiliary combustion chamber is spherical.

10. An internal combustion engine as defined in claim 1, wherein:
said auxiliary combustion chamber is elliptical in cross-section.

11. An internal combustion engine comprising:
a cylinder;
a cylinder head;
means defining an intake port in said cylinder head;
a piston in said cylinder;
said piston, said cylinder, and said cylinder head defining a main combustion chamber;
an intake valve operatively associated with said intake port;
means defining an auxiliary combustion chamber having no intake valve, said auxiliary combustion chamber being positioned adjacent said intake port;
an ignition plug having an electrode within said auxiliary combustion chamber;
means defining a plurality of passages fluidly intercommunicating said main combustion chamber and said auxiliary combustion chamber, one end of a first one of said passages opening into said main combustion chamber toward said intake valve and the other end thereof opening into said auxiliary combustion chamber, one end of a second one of said passages opening into said main combustion chamber and the other end thereof opening into said auxiliary combustion chamber at a position spaced from the opening of said first passage thereinto, the central axis of said second passage being not in a plane containing the central axis of the first passage; and
said means defining said auxiliary combustion chamber being free of any fluid flow obstructions which extend thereinto from the portion thereof between the first and second passages and being so constructed and arranged that a stream of sucked gas entering the auxiliary combustion chamber through the first passage follows a flow path in the form of a loop in the auxilary combustion chamber and is then discharged through said second passage.

12. An internal combustion engine comprising:
a cylinder;
a cylinder head;
means defining an intake port in said cylinder head;
a piston in said cylinder;
said piston, said cylinder, and said cylinder head defining a main combustion chamber;
an intake valve operatively associated with said intake port;
means defining an auxiliary combustion chamber, having no intake valve, in said cylinder head, said auxiliary combustion chamber being positioned adjacent said intake port and having a central longitudinal axis;
an ignition plug having an electrode within said auxiliary combustion chamber; and
means defining a plurality of passages fluidly intercommunicating said main combustion chamber and said auxiliary combustion chamber, one end of a first one of said passages opening into said main combustion chamber toward the intake valve and the other end thereof opening into said auxiliary combustion chamber adjacent the central axis thereof, one end of a second one of said passages opening into said main combustion chamber and the other end thereof opening into said auxiliary combustion chamber, one end of a third one of said passages opening into said main combustion chamber and the other end thereof opening into said auxiliary combustion chamber, said second and third passages being disposed symmetrically relative to the central axis of the auxiliary combustion chamber, the central axis of each of said second and third passages being not in a plane containing the central axis of the first passage, whereby a stream of sucked gas entering the auxiliary combustion chamber through the first passage follows a flow path in the form of a loop in the auxiliary combustion chamber and is then discharged through said second and third passages.

13. An internal combustion engine comprising:
a cylinder;
a cylinder head;
means defining an intake port in said cylinder head;
a piston in said cylinder;
said piston, said cylinder, and said cylinder head defining a main combustion chamber;
an intake valve operatively associated with said intake port;
means defining an auxiliary combustion chamber, having no intake valve, in said cylinder head, said auxiliary combustion chamber being positioned adjacent said intake port;
means defining a plurality of passages fluidly intercommunicating said main combustion chamber and said auxiliary combustion chamber, one end of a first one of said passages opening into said main combustion chamber toward said intake valve and other end thereof opening into said auxiliary combustion chamber, one end of a second one of said passages opening into said main combustion chamber and the other end thereof opening into said auxiliary combustion chamber at a position spaced from the opening of said first passage thereinto whereby a stream of sucked gas entering the auxiliary combustion chamber through the first passage follows a flow path in the form of a loop in the auxiliary combustion chamber and is then discharged through said second passages;

a first ignition plug having an electrode within said auxiliary combustion chamber at a position most remote from the first and second passages; and a second ignition plug having an electrode within said auxiliary combustion chamber, said second plug being on the same side of said auxiliary combustion chamber as said first passage and being positioned between said first passage and said first plug.

14. An internal combustion engine as claimed in claim 13, wherein:

said second plug lies substantially midway between said first passage and said first plug.

15. An internal combustion engine as claimed in claim 14, wherein:

said auxiliary combustion chamber is elliptical in longitudinal transverse cross-section.

* * * * *